Nov. 13, 1951    R. LORENZEN    2,574,647
MAGNETOSTRICTIVE MODULATOR
Filed April 12, 1947    2 SHEETS—SHEET 1

Robert Lorenzen
INVENTOR

BY
Atty

Robert Lorenzen
INVENTOR,

BY

Patented Nov. 13, 1951

2,574,647

UNITED STATES PATENT OFFICE 2,574,647

MAGNETOSTRICTIVE MODULATOR

Robert Lorenzen, New York, N. Y., assignor to Electronic Systems Corporation, a corporation of New York Application April 12, 1947, Serial No. 741,092

4 Claims. (Cl. 332—29)

The present invention relates to magnetostrictive frequency modulators, particularly of the type wherein a relatively low signal frequency is utilized to frequency-modulate a relatively high carrier frequency.

One of the principal objects of the present invention is to show how a signal voltage can cause a carrier frequency to become frequency-modulated, as a result of impedance changes brought about by the magnetostrictive properties of certain materials.

Frequency modulation as a means of communication is quite old, although it is only in relatively recent years that it has become of commercial importance. As a result, several different types of frequency modulators have been devised in order to effect such frequency modulation, each type having its own peculiar advantages and disadvantages. The frequency modulator herewith described is believed to possess certain advantages not found in the other types.

When certain materials are subjected to a magnetic field, they suffer a deformation. This phenomenon is known as magnetostriction, and these materials are said to possess magnetostrictive properties. In particular, if a rod, which is composed of a magnetostrictive material, is subjected to a magnetic field, it will become either longer or shorter, depending upon the material and upon the incremental polarity of the magnetic field. The internal stresses, set up in the rod as a result of its deformation by the magnetic field, cause the rod to resume its former shape when the magnetic field is removed.

In order that the invention or discovery may be understood, attention is invited to the accompanying drawings, in which.

Figure 1:
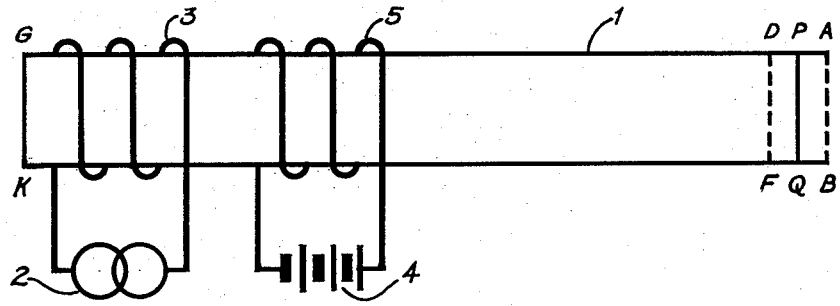
Fig. 1 shows a magnetostrictive rod or tube having one end rigidly clamped or mounted.

Referring to the drawings,

Fig. 1 shows a magnetostrictive rod or tube 1, one end GK of which is rigidly clamped so as to be incapable of motion. For the sake of illustration, assume that the rod is made of nickel, which has the property of contracting in length when subjected to a magnetic field, regardless of the polarity of the field. When no magnetic field is applied, the other end of the nickel rod would be in position AB of Fig. 1. If an alternating magnetic field is applied to the rod as a result of alternating current from generator 2 flowing through coil 3, the rod will alternately contract and expand. At the time of zero current, the rod will be in the position AB. On the positive alternation of current the rod will contract, so that at the peak of the positive alternation the rod will contract to position PQ. As the current approaches zero the rod will expand, so that when the current is again zero, the rod will reassume position AB. As the current increases on the negative alternation, the rod contracts, and, at the peak of the negative current alternation, the rod contracts to position PQ. As the negative alternation decreases in magnitude, the rod expands, so that for zero current the rod is again at position AB. In other words, the rod contracts twice for each cycle of alternating current.

In order to make the rod elongate for one alternation of current and contract on the opposite alternation of current, it is necessary to polarize the rod. This can be accomplished in several different ways, and is performed in Fig. 1 by means of a direct current from source 4 flowing through the polarizing coil 5. When no alternating current is flowing, the polarizing field will cause the rod to assume position PQ. Let it be assumed that the direction of windings of coils 3 and 5 and the polarity of sources 2 and 4 is such that a positive alternation of current from source 2 through coil 3 causes the magnetic field of coil 3 to be opposite to that of coil 5, while a negative alternation of current through coil 3 causes both coils 3 and 5 to have the same magnetic polarity. Then, for zero value of alternating current through coil 3, the rod will have position PQ as a result of the polarizing field. At the peak of the positive alternation of current through coil 3, since the fields of coils 3 and 5 buck or oppose each other, the effective magnetic field will be diminished, and the rod will assume position AB. For zero alternating current through coil 3, the rod will again assume its center position PQ. At the peak of negative alternation of current through coil 3, the magnetic fields of coils 3 and 5 aid each other, the effective magnetic field is greater than for the polarizing field alone, so that the rod contracts to position DF. It is therefore seen that the length of the polarized rod cyclically follows the alternating current, that is, one direction of alternation of current causes the rod to become longer than its mean position, while an opposite direction of current alternation causes the rod to become shorter than its mean position.

It is desirable that the polarizing magnetic field be of such strength that a suitable mean operating point on the length versus magnetization characteristic be chosen, so that the incremental elongation and contraction from a mean position are equal, for equal but opposite increments of the magnetic field. It is further desirable that the peak of the alternating magnetic field strength never exceed the polarizing magnetic field strength, as this would result in non-linearity of operation. It should be understood that the alternating current wave of source 2 in Fig. 1 may be either sinusoidal or non-sinusoidal, simple or complex, in other words, may possess any wave-form whatever, and may be either recurrent or non-recurrent, and, with regard to frequency may be either sonic (audio frequency), subsonic, or supersonic. The polarizing current will not, in general, come from a battery 4 as is shown in Fig. 1, but will more generally consist of rectified alternating current, since most devices today employ alternating current as a primary source of power.

Figure 2:
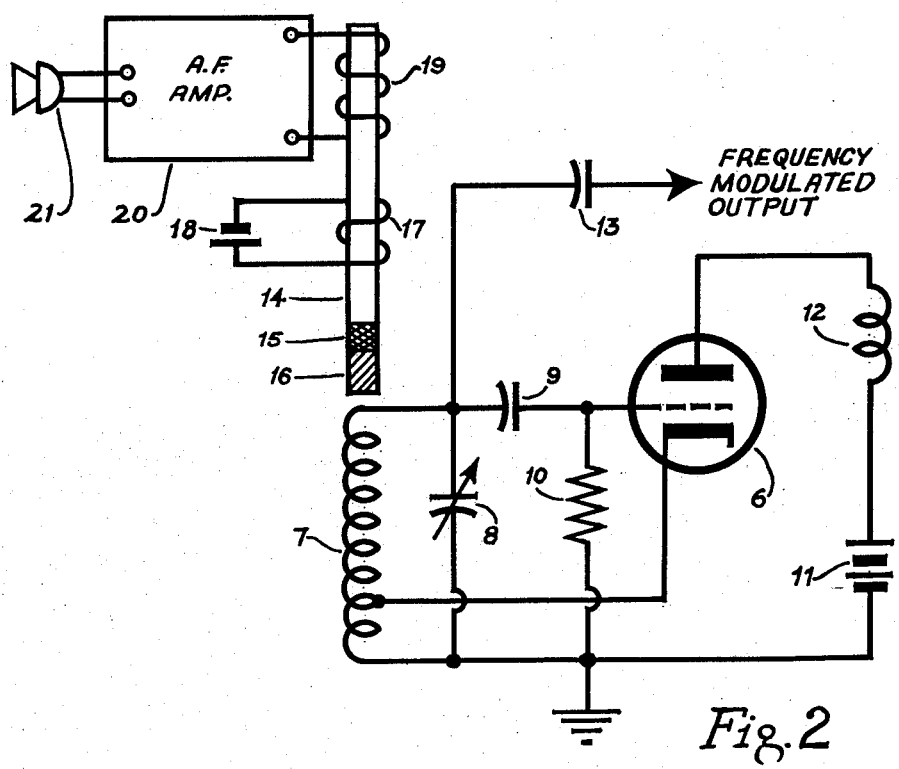
Fig. 2 is a diagrammatic view showing one means for utilizing the phenomenon of magnetostriction, to cause changes in the inductance of an oscillator circuit.

In Fig. 2 is shown one means for utilizing the phenomenon of magnetostriction for the purpose of frequency modulating an oscillator. The Hartley type oscillator is comprised of tube 6 (which may be a 6J5 or other suitable type), an inductance 7, a tuning condenser 8, a grid condenser 9, a grid leak resistor 10, a plate supply source 11 which supplies plate voltage to the tube through the radio-frequency choke 12. Condenser 13 acts as a coupling condenser from which is taken the frequency-modulated output.

One end of the magnetostrictive rod 14 is clamped so as to be immovable. Attached to the other end of magnetostrictive rod 14 is an insulating material 15, which insulates plug 16 from the magnetostrictive rod. Plug 16 may consist either of a material possessing permeability or may consist of a conductor not possessing permeability, as will hereinafter be discussed.

The polarizing coil 17 derives its current from battery 18 or other suitable source. Coil 19, which henceforth will be called the signal coil, is fed from the output of any suitable audio frequency amplifier 20, which latter is actuated by microphone 21.

Audio frequency vibrations strike microphone 21, are electrically amplified by audio frequency amplifier 20, the resulting current variations being supplied to signal coil 19. These current variations cause a varying magnetic field, and the magnetostrictive rod lengthens and shortens from some mean position that is determined by the polarizing field. Since plug 16 is attached to the magnetostrictive rod, this plug 16 changes its relative location with respect to the fixed coil 7. Plug 16 is located near, or somewhat within, coil 7. First, let it be assumed that plug 16 is comprised of some material possessing permeability, such as powdered iron or other suitable material. When no audio frequency current is supplied to the signal coil 19, the polarizing field maintains the magnetostriction rod 14, and consequently plug 16 in some fixed mean position. Since the relative position of plug 16 to coil 7 is one of the factors which determines the inductance of coil 7, the inductance of the coil for this no-signal condition will be called the mean inductance. Now when audio frequency currents are supplied to the signal coil, the magnetostrictive rod will elongate and contract, in consequence of which the plug 16 will approach and recede from coil 7. When plug 16 approaches coil 7, since it is here assumed that plug 16 possesses permeability, the effective inductance of coil 7 will increase above its mean value, and the frequency of the oscillator will be lowered. On the other hand, when plug 16 recedes from its mean position in relation to coil 7, the effective inductance of coil 7 will decrease below its mean inductance value, and the oscillator frequency will rise above its mean or center frequency.

If plug 16 were comprised of some material which had negligible permeability, such as brass, the effect would be the opposite of that just described. When plug 16 approached coil 7, the effective inductance of coil 7 would decrease below its mean value, in consequence of which the oscillator frequency would become higher than its no-signal or center frequency.

Similarly, when the brass plug receded from coil 7 in relation to their mean position, the effective inductance of coil 7 would increase above its mean inductance, and the oscillator would consequently oscillate at a frequency that was lower than its center frequency.

Whichever of the two aforementioned methods is employed, it is seen that the center frequency of the oscillator is caused to shift from its mean frequency in accordance with the audio-frequency signal. The output of the oscillator that is obtained from the output side of condenser 13 is therefore a frequency-modulated wave.

Figure 3:
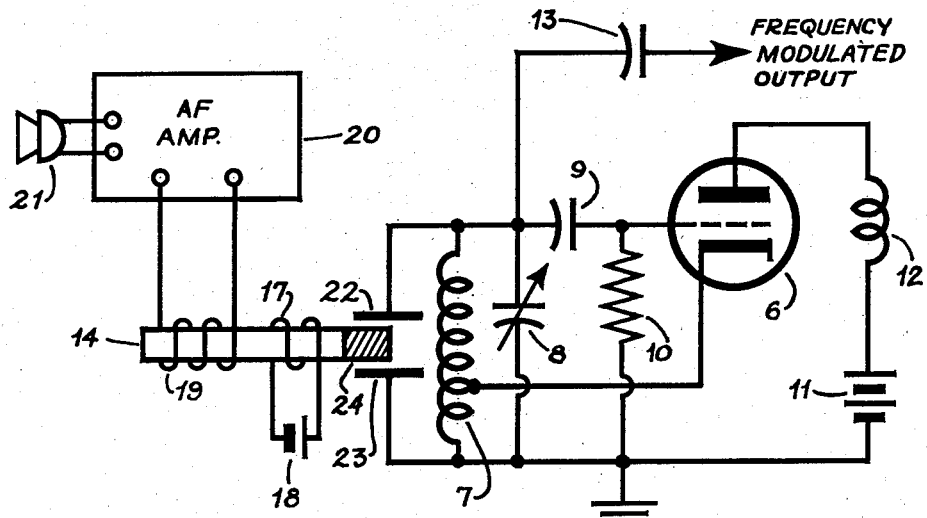
Fig. 3 is a diagrammatic view showing means for enabling the magnetostriction phenomenon to cause variations in capacitive reactance.

Fig. 3 illustrates a means for enabling the magnetostriction phenomenon to cause variations in capacitive reactance, thereby producing a frequency-modulated wave. The circuital components are the same as those for Fig. 2 and are therefore similarly numbered, with the exception of components 22, 23, and 24. Items 22 and 23 each consist of a metallic conducting plate, so that when considered together they comprise an auxiliary condenser that is shunted across coil 7. Plug 24 consists of a dielectric material that is attached to the end of the magnetostrictive rod 14. Plug 24 is located near, or preferably slightly between condenser plates 22 and 23.

For the no-signal condition, tuning condenser 8, coil 7, and the condenser comprised of plates 22 and 23 in conjunction with dielectric 24, which latter is in some mean position, determine the mean or center frequency of the oscillator. When signal currents are supplied to signal coil 19, the magnetostrictive rod 14 becomes longer and shorter than its mean length, and therefore more or less respectively of plug 24 is enclosed by plates 22 and 23. When the magnetostrictive rod 14 elongates and more of dielectric plug 24 is enclosed by plates 22 and 23, the effective capacitance of the circuit is increased above its mean capacitance, and accordingly the frequency of the oscillator is decreased below that of its mean or center frequency. On the other hand, when the magnetostrictive rod 14 becomes shorter than its mean length, less of dielectric plug 24 is included between plates 22 and 23. Consequently, the effective capacitance of the circuit is decreased, and the oscillator frequency is increased above its mean or center frequency. Accordingly, audio frequency currents flowing in signal coil 19 cause the capacitance of the auxiliary condenser, comprised of items 22, 23, and 24, to vary, thereby resulting in frequency modulating the oscillator.

Figure 4:
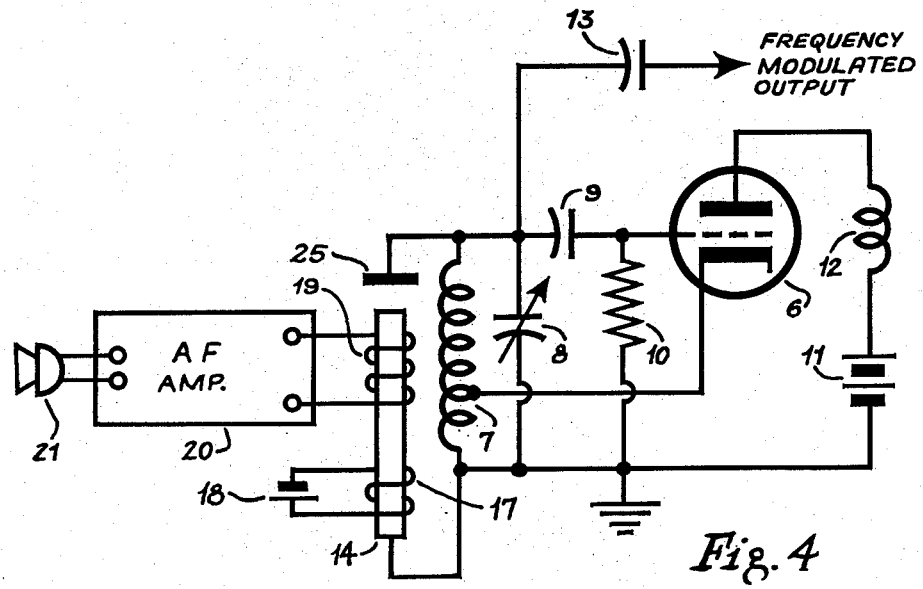
Fig. 4 is a diagrammatic view of another manner in which capacitance of a tuned oscillator circuit can be varied.

Fig. 4 illustrates another manner in which the capacitance of the tuned oscillator circuit can be varied. A conducting plate 25 is located near the movable end of the magnetostrictive rod 14. The tuned-circuit return path is preferably connected via lead 26 to the immovable end of the magnetostrictive rod 14, so that the lead contact is not subjected to excessive vibration. The audio frequency currents in signal coil 19 cause the magnetostrictive rod 14 to vibrate, thereby causing the end of the magnetostrictive rod 14 to approach and recede from the conducting plate 25. Since the magnetostrictive rod 14 and the conducting plate 25 act as a shunt capacitance across the oscillator tuned circuit, the increase and decrease in capacitance as the magnetostrictive rod 14 approaches and recedes from conducting plate 25, results in a decrease and increase respectively of the oscillator frequency. Accordingly, the oscillator becomes frequency modulated.

Although the oscillator circuit shown in the illustrations is of the Hartley type, it is obvious that the technique of employing magnetostriction to alter the inductance or capacitance of a tuned oscillator circuit is equally applicable to any other type of oscillator.

It is to be understood that the shape of the plugs shown in the various drawings is symbolic, for the shape of these plugs may be of any desired form that is suitable to give a required response. For example, these plugs may assume the form of metallic or non-metallic vanes of suitable shape.

What is claimed is:

1. A frequency modulator including in combination an elongated body of magnetostrictive metal fixedly held at one end, electrical means including a coil wound around one portion of said body and for magnetizing and demagnetizing such body to cause contraction and extension of such body, a second coil wound around said body, direct current energy connected to said latter coil, an oscillator and cooperative means interposed between the body of magnetostrictive metal and the oscillator for causing a variation in the magnetic effect in said body and thereby produce frequency modulation in the oscillator by causing a variation in a single lumped circuital constant of the oscillator.

2. A frequency modulator including in combination a body of magnetostrictive metal, a coil carrying direct current wound around said metal, a second electrical means for magnetizing and demagnetizing such body, a dielectric plug carried at one end of the said body, an oscillator and two metallic conducting plates connected to the oscillator and spanning said dielectric plug so that the frequency of the oscillator is changed by the varying influences of the dielectric plug and spanning plates, due to the contraction and expansion of the body of magnetostrictive metal.

3. A frequency modulator including in combination a body of magnetostrictive metal, a coil carrying direct current wound around said metal, a second electrical means for magnetizing and demagnetizing such body, an active polarizing coil disposed to influence said body, an oscillator and a conducting plate connected to the oscillator and in spaced relation to the movable end of the body of magnetostrictive metal whereby the influence of such body upon the plate produces frequency changes in the oscillator.

4. A frequency modulator including in combination a body of magnetostrictive metal, a coil carrying a direct current wound around said magnetostrictive body, a second coil wound around the said body, an audio-frequency alternating current amplifier to which said second coil is connected to cause the body to expand and contract alternately, a microphone connected to the input of the audio-frequency amplifier for causing the magnetic effect in said body to produce frequency modulation, and an oscillator having a coil disposed in a position relatively to the magnetostrictive metal so that said oscillator is frequency modulated when such metal is caused to expand and contract.

ROBERT LORENZEN.

REFERENCES CITED

The following references are of record in the file of this patent:

UNITED STATES PATENTS

| Number | Name | Date |
| --- | --- | --- |
| 1,677,191 | Loynes | July 17, 1928 |
| 1,841,459 | Taylor | Jan. 19, 1932 |
| 2,217,280 | Koch | Oct. 8, 1940 |
| 2,353,162 | Kaltenbacher | July 11, 1944 |